United States Patent [19]

Cessna

[11] Patent Number: 5,180,472
[45] Date of Patent: Jan. 19, 1993

[54] METHOD FOR THE MANUFACTURE OF ANTI-STATIC SHEETS FOR USE IN HIGH PRESSURE LAMINATES

[75] Inventor: Frank L. Cessna, Middletown, Ohio

[73] Assignee: The Sorg Paper Company, Middletown, Ohio

[21] Appl. No.: 748,626

[22] Filed: Aug. 22, 1991

Related U.S. Application Data

[60] Division of Ser. No. 333,093, Apr. 4, 1989, Pat. No. 5,089,327, which is a continuation-in-part of Ser. No. 50,076, May 15, 1987, abandoned.

[51] Int. Cl.[5] ............................................. D21H 27/18
[52] U.S. Cl. .................................... 162/138; 162/141; 162/148; 162/149; 162/164.1
[58] Field of Search ............... 162/135, 138, 141, 148, 162/149, 164.1

[56] References Cited

U.S. PATENT DOCUMENTS

| | | | |
|---|---|---|---|
| 3,372,084 | 3/1968 | Arledter | 162/149 |
| 3,991,256 | 11/1976 | Cornier et al. | 428/514 |
| 4,454,199 | 6/1984 | Berbeco | 428/322.2 |
| 4,480,001 | 10/1984 | Cannady et al. | 428/284 |
| 4,569,888 | 2/1986 | Muller et al. | 428/481 |
| 4,652,324 | 3/1987 | Yamashina et al. | 162/138 |
| 4,662,514 | 5/1987 | Berbeco | 206/328 |
| 4,778,711 | 10/1988 | Hosomura et al. | 162/138 |

FOREIGN PATENT DOCUMENTS 6034733  8/1979  Japan .

OTHER PUBLICATIONS

*The Dictionary of Paper*, 3rd ed. (1965) Publ. Amer. Paper & Pulp Assoc., N.Y., p. 18.
Calgon Corporation, Bulletin 28-5a, 1978—Lectrapel.

*Primary Examiner*—Peter Chin
*Attorney, Agent, or Firm*—Frost & Jacobs

[57] ABSTRACT

An anti-static paper sheet for use in high pressure laminates comprised of Pontiac hardwood, high alpha hardwood, and cotton linters, the sheet being initially treated with a wet strength resin and saturated with a water soluble polycationic quaternary ammonium polymer which is free from metallic salts in an amount of at least about one pound of polymer to 1000 square feet of sheet material having a basis weight of about 75 pounds per ream, the anti-static polymer being applied at a temperature of from about 135° F. to about 155° F.

6 Claims, No Drawings

METHOD FOR THE MANUFACTURE OF ANTI-STATIC SHEETS FOR USE IN HIGH PRESSURE LAMINATES

This is a division of U.S. application Ser. No. 07/333,093 filed Apr. 4, 1989, now U.S. Pat. No. 5,089,327, issued Feb. 18, 1992, which was a continuation in-part of U.S. application Ser. No. 07/050,076 filed May 15, 1987, now abandoned.

This invention relates to high pressure laminates of the type utilized in the manufacture of office furniture, such as word processor work stations, and has to do more particularly with the provision of a laminating sheet having exceptional anti-static properties.

BACKGROUND OF THE INVENTION

The problem of static electricity has become an ever increasing problem in environments where electronic equipment, such as computers and word processors, are in use. Basically, static is created when two similar materials are rubbed together and then separated. One object tends to give up electrons whereas the other tends to accumulate them, thereby leaving the former with a positive static charge and the latter with a negative charge. When oppositely charged objects contact each other, a static shock is created which corrects the imbalance.

Since the human body is almost a perfect conductor of electricity, studies of human movement in the office have shown that voltages in the range of 10,000 volts and higher can be generated. When discharged, these voltages can cause serious electrostatic damage to electronic components. A simple example of electrostatic discharge involves a person walking across a dry carpet in a dry atmosphere and touching a metallic object. The charge built up by the person moving across the carpet is retained throughout the person's body. As the person's hand reaches for the object a short distance away, the air's breakdown voltage is exceeded and an instantaneous blue arc occurs between the hand and the object. Interestingly, if breakdown voltage is not achieved (the charge generated is relatively small), the person will still discharge when touching the object. Particularly important is the fact that the person will not sense a discharge of less than 3500 volts. If this same person were reaching for an electronic component, such as a board or device on a grounded conductive table top, the discharge would occur through the component. Since many components and devices are sensitive to potentials far less than 3500 volts, the component could be damaged, and the person involved would have no way of knowing the cause.

Materials differ in their abilities to create and hold static charges, and over the years various expedients have been employed to provide anti-static properties. For example, substantial work has been done in the field of textiles, and also in other fields, including high pressure laminates and various types of cellulosic and non-cellulosic soft goods. Basically, these efforts have been directed to the use of additives such as metallic salts and carbon fibers. However, as applied to the decorative field, i.e., high pressure laminates, considerable difficulty has been experienced due to bleeding or blooming of the anti-static materials, particularly in the top or surface sheet of the laminate, thereby interfering with the coloring and/or decorative effects created on the top sheet. As a result, there has been no adequate solution to the problem of providing effective anti-static properties in resinous laminates.

Various anti-static chemical additives have been utilized for paper and for cellulosic and non-cellulosic non-woven disposable soft goods to minimize the discharge of static electricity, as encountered in high-speed printing and converting operations and also in the use of disposable soft goods, such as tissues. A product particularly suited for this purpose is LECTRAPEL ® which is a water soluble polycationic quaternary ammonium polymer manufactured by Calgon Corporation. Applications of 0.0025 to 0.01 pound solids per 1000 square feet of paper, paperboard or non-woven textile fabric are the normal range in which this material is applied to the sheet being treated. Higher concentrations have not been recommended due to puddling of the material and the anticipated adverse effect on the ability of the treated sheet to be saturated with resin or other desired saturants. Consequently, materials such as LECTRAPEL ® have hitherto been regarded as unsuitable for use in high pressure laminates.

SUMMARY OF THE INVENTION

Contrary to the accepted understanding in the industry, it has now been found that water soluble polycationic quaternary ammonium polymer, can be effectively incorporated in the top sheet of a high pressure laminate to provide effective anti-static properties if certain conditions are observed.

Paramount among these conditions is the nature of the sheet being treated, it being essential that the sheet be open and porous since, contrary to prior applications utilizing anti-static chemical additives, it has been found desirable to introduce as much of the chemical additive into the sheet as possible. Preferably, the sheet is composed of Pontiac hardwood, (as available from Consolidated Pontiac, Inc. under the same S-80) high alpha (i.e., 90% or more pure alpha pulp) hardwood and cotton linters, each of which contributes to the effectiveness of the sheet for laminating purposes as well as retention of the anti-static polymer.

Contrary to prior uses of the chemical additive, it is applied to the sheet in massive amounts, preferably in the range of 154 gallons per hour by a one side treatment through a sizing press. This equates to an application of about 1.067 pounds of polymer per 1000 square feet of paper, which is approximately 100 times the quantity heretofore utilized in paper and board applications.

In order to effect the desired pickup, it is necessary to control the temperature of the polymer as it is being applied since, at the desired level of application, it has a tendency to gel and harden.

It is also necessary to add a wet strength resin, such as melamine-formaldehyde, to the paper stock at the wet end of the paper making machine to ensure that the sheet will have sufficient wet strength to go through the sizing press and receive the anti-static polymer.

Sheets treated in accordance with the invention have been found to have a resistivity (ohms/square) of from $10^7$ to $10^8$, which is well within industry standards for effective anti-static properties.

DESCRIPTION OF THE PREFERRED EMBODIMENTS

A laminating sheet in accordance with the present invention preferably will comprise a 75 lb. sheet (24×36×500) which is free from sizing. The fiber makeup of the sheet is as follows:

| | |
|---|---|
| 47%–53% | Pontiac hardwood, with a standard of 50% |
| 37%–39% | high alpha hardwood, with a standard of 38% |
| 8%–16% | cotton linters, with a standard of 12% |

The furnish is treated at the wet end of the paper making machine with a wet strength resin to ensure that the sheet will retain its integrity during application of the anti-static polymer. Since melamine-formaldehyde is a widely used laminating resin, it may be used to provide the desired wet strength. Other types of wet strength resins, such as urea-formaldehyde, may be used, as may neutral cure resins, such as kymene resin. Excellent results are achieved by adding 2% resin to the furnish on a dry weight basis, i.e., 2 pounds resin to 100 pounds of dry fibers. As will be understood by the worker in the art, melamine-formaldehyde, which is the preferred wet strength resin, requires acid to act as a catalyst so that the melamine-formaldehyde will become an efficient wet strength agent. In other words, to gain sufficient wet strength for the sheet to go through the sizing press and accept large amounts of liquid, an acid, preferably alum, must be added to the wet end of the paper making machine to give the melamine-formaldehyde resin its optimum wet strength characteristics.

The sheet so formed is fed into a conventional sizing press where it is treated with the anti-static polymer, which is a water soluble polycationic quaternary ammonium polymer known as LECTRAPEL ® manufactured by Calgon Corporation. This material is mixed in a ratio of 1.5 gallons of polymer to 4.5 gallons of water in a tub solution, giving a fractometer reading of 14° brix.

The solution may be applied to the sheet on a conventional sizing press utilizing a one or two side treatment, with the sheet preferably running at 450 feet per minute. In order to optimize penetration, the solution is applied at a temperature of from 135° F. to 155° F., preferably at 140° F., at which temperature optimum penetration is achieved, the pickup preferably being 154 gallons per hour which equates to 4.2% solids being retained in the sheet. Preferably the pH of the paper will be maintained at 5.5 for optimum penetration of the laminating resin, except where neutral cure resins are utilized to provide the desired wet strength, in which event pH will be in the range of 7–7.2. In operating the size press, care must be taken to carefully adjust the solution flow to ensure uniform application of the solution.

When treated in the manner described, the sheet has a resistivity (ohms/square) of $10^7$ to $10^8$, which is highly desirable for anti-static properties. When utilized in a high pressure laminate, it has been found that the anti-static polymer will not migrate, yet the sheet may be saturated with melamine-formaldehyde or other laminating resins without losing its anti-static properties or its color, irrespective of whether it is a solid color or a decorative motif.

What is claimed is:

1. A method of manufacturing an anti-static laminating sheet which comprises providing a furnish composed of:
   47%–53% Pontiac hardwood
   37%–39% high alpha hardwood
   8%–16% cotton linters
forming said furnish into a sheet and saturating said sheet with a water solution of a water soluble polycationic quaternary ammonium polymer which is free from metallic salts, said solution being mixed in a portion of about 1.5 gallons of polymer to about 4.5 gallons of water, said polymer solution being applied to said sheet at a temperature of from 135° F. to 155° F., including the step of adding a wet strength resin to said sheet as an incident of its formation in a quantity sufficient to maintain the integrity of the sheet during saturation with said polymer solution.

2. The method claimed in claim 1 wherein said polymer solution is applied to said sheet at a temperature of about 140° F.

3. The method claimed in claim 1 wherein the sheet material has a basis weight of about 75 pounds per ream and is run at a speed of at least about 450 feet per minute.

4. The method claimed in claim 1 wherein the wet strength resin is added in an amount of about 2% based on the dry weight of the fibers.

5. The method claimed in claim 4 wherein the wet strength resin comprises melamine-formaldehyde, and where the pH of the paper is maintained at about 5.5.

6. The method claimed in claim 2 wherein the sheet material has a basis weight of about 75 pounds power ream and is run at a speed of at least about 450 feet per minute.

* * * * *